Jan. 7, 1936. W. A. BLACK 2,027,265
BARREL TRUCK
Filed Feb. 24, 1934
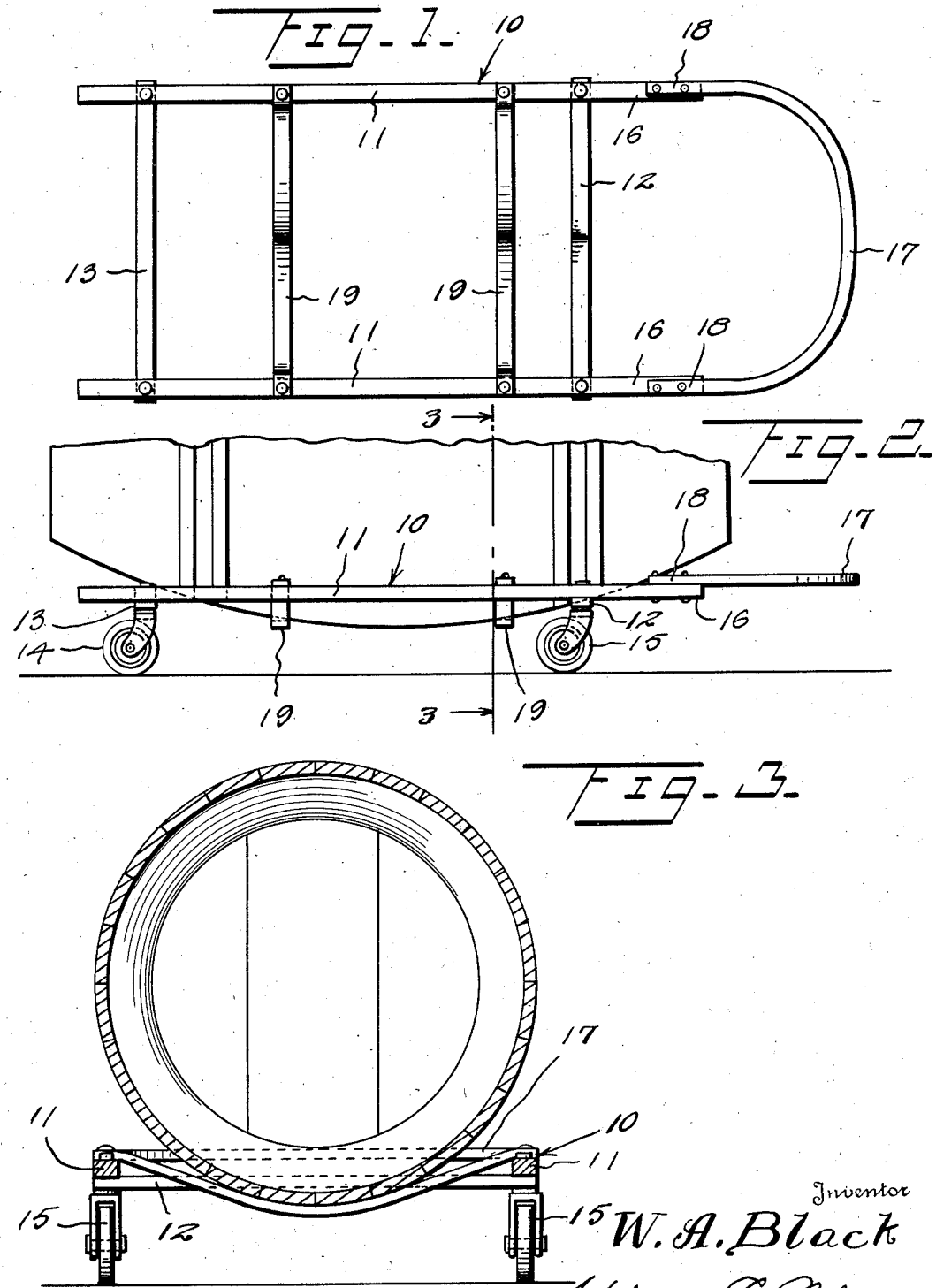
Inventor
W. A. Black
By Watson E. Coleman
Attorney Patented Jan. 7, 1936

2,027,265

UNITED STATES PATENT OFFICE 2,027,265

BARREL TRUCK

William A. Black, New Richmond, Wis.

Application February 24, 1934, Serial No. 712,835

1 Claim. (Cl. 280—61)

This invention relates to wheeled trucks and has for an important object thereof the provision of a relatively light truck which is constructed for use in holding round objects or, if desired, flat objects for transfer from one point to another.

Another object of this invention is to provide a wheeled truck which is constructed for use in handling barrels so as to hold the barrels against rolling while permitting movement of the barrel over a plane surface without injury to the surface or undue agitation of the contents of the barrel.

The above and various other objects and advantages of this invention will in part be described and in part be understood from the following detailed description of the present preferred embodiment, the same being illustrated in the accompanying drawing wherein:—

Figure 1 is a top plan view of the device constructed according to the preferred embodiment of this invention.

Figure 2 is a detail side elevation of the device having a barrel mounted thereon, the barrel being shown in fragmentary form.

Figure 3 in an enlarged sectional view taken on the line 3—3 of Figure 2.

Referring to the drawing wherein like numerals of reference designate corresponding parts throughout the several views, the numeral 10 designates generaly a frame structure of substantially rectangular configuration, comprising side bars 11 and end bars 12 and 13. The bar 12 is disposed at the forward end of the device and the bar 13 is disposed at the rear or opposite end. Each of these bars 12 and 13 are secured to the underside of the side bars 11. The bar 13 is disposed at a point spaced inwardly from the rear end of the side bars 11 and rear castor wheels 14 are secured to the frame 10 at the point of connection of the end bar 13 with the side bars 12. Front castor wheels 15 are secured to the frame 10 beneath the point of connection of the front cross bar 12 with the side bars 11.

The side bars 11 are each provided with extensions 16 which extend forwardly, and a curved nose bar 17 having extensions 18 at each end thereof is secured to the two extensions 16 and extends forwardly of the front cross bar 12. A pair of arcuate barrel supporting cross bars 19 are secured to the frame 10 intermediate the front and rear cross bars 12 and 13, respectively. These arcuate barrel supporting bars 19 have the opposite ends thereof mounted on the upper side of the side bars 11 and may be secured as by rivets, welding or the like.

Preferably the castor wheels 14 and 15 are provided with rubber tired wheels so that the movement of the truck with an article mounted thereon over a smooth surface such as a smooth polished floor, will not injure the surface of the floor.

In the use of the truck herein disclosed, the barrel is initially stood on end where the barrel is relatively large and the nose bar 17 is projected beneath the bottom end of the barrel when the barrel is tilted forwardly slightly so as to permit the projection of the nose piece 17 therebeneath. In this position, the rear end of the frame 10 is raised and the barrel is then rocked toward the frame 10 with the nose piece 17 engaging the ground or floor. The frame 10 with the barrel engaging the curved bars 19 is then lowered so that the castor wheels 14 and 15 will engage the floor whereupon the device may be rolled to the desired point and the barrel removed, as may be desired.

It is apparent from the foregoing that an exceedingly simple and at the same time very light frame has been devised for use in the transfer of barrels containing liquids or of boxes, cartons or the like, and in view of the cushioned wheels, when the device is moved over a highly polished floor, the floor will not be injured and the liquid contents of the barrel will not be agitated as is the case where a barrel is rolled over a plane surface.

It is, of course, understood that various changes and modifications may be made in the details of construction and design of the above specifically described embodiment of this invention without departing from the spirit thereof, such changes and modifications being restricted only by the scope of the following claim.

What is claimed is:—

A barrel truck as set forth, comprising a frame structure, castor wheels secured to the frame at each corner thereof, said frame comprising a pair of side bars disposed in parallel relation, cross bars disposed beneath the side bars, one adjacent each end of the side bars, means securing the cross bars to the side bars, a pair of curved barrel supporting bars disposed between the end bars and each having a horizontal extension at each end engaging on the upper side of the side bars, means for securing said extensions to said side bars, a U-shaped nose bar, and means for securing the parallel end portions of the nose bar to an end of each side bar.

WILLIAM A. BLACK.